United States Patent
Widell et al.

(10) Patent No.: US 9,549,055 B2
(45) Date of Patent: Jan. 17, 2017

(54) METHOD IN AN ELECTRONIC MOBILE DEVICE, AND SUCH A DEVICE

(71) Applicant: Sony Corporation, Tokyo (JP)

(72) Inventors: Alfred Widell, Lund (SE); Martin Nystrom, Horja (SE)

(73) Assignee: Sony Corporation, Tokyo (JP)

(*) Notice: Subject to any disclaimer, the term of this patent is extended or adjusted under 35 U.S.C. 154(b) by 274 days.

(21) Appl. No.: 14/382,824

(22) PCT Filed: Nov. 6, 2013

(86) PCT No.: PCT/IB2013/002466
§ 371 (c)(1),
(2) Date: Sep. 4, 2014

(87) PCT Pub. No.: WO2015/067981
PCT Pub. Date: May 14, 2015

(65) Prior Publication Data
US 2016/0241693 A1    Aug. 18, 2016

(51) Int. Cl.
*H04B 1/38* (2015.01)
*H04M 1/00* (2006.01)
*H04M 1/60* (2006.01)
*H04R 1/10* (2006.01)

(52) U.S. Cl.
CPC ......... *H04M 1/6058* (2013.01); *H04R 1/1083* (2013.01); *H04M 2250/12* (2013.01); *H04R 2201/107* (2013.01); *H04R 2430/01* (2013.01)

(58) Field of Classification Search
CPC ............ H04M 1/6058; H04M 2250/12; H04R 1/1083; H04R 2430/01
See application file for complete search history.

(56) References Cited

U.S. PATENT DOCUMENTS

| | | |
|---|---|---|
| 7,961,869 B1 | 6/2011 | Zhang et al. |
| 2011/0183629 A1 | 7/2011 | Walley |
| 2011/0228950 A1 | 9/2011 | Abrahamsson et al. |

(Continued)

FOREIGN PATENT DOCUMENTS

| | | |
|---|---|---|
| GB | 2 483 493 A | 3/2012 |
| WO | WO 2007/110807 A2 | 10/2007 |

OTHER PUBLICATIONS

International Search Report for International Application No. PCT/IB2013/002466 mailed Jul. 23, 2014, 4 pages.

(Continued)

*Primary Examiner* — Nguyen Vo
(74) *Attorney, Agent, or Firm* — Myers Bigel, P.A.

(57) ABSTRACT

A method in a first electronic mobile device for adapting audio performance parameters is provided. The first electronic mobile device performs an audio interaction with a second electronic device. The first electronic mobile electronic device is associated with at least one earpiece comprising at least one speaker and at least one microphone. The method comprises detecting an acoustic echo between the at least one speaker and the at least one microphone, determining, based on the detected acoustic echo, position of the at least one earpiece in relation to a user of the first electronic mobile device, and adapting audio performance parameters, based on the detected position of the earpiece, whereby less echo during the audio interaction is achieved in the second electronic device.

11 Claims, 6 Drawing Sheets

(56) References Cited

U.S. PATENT DOCUMENTS

2012/0086551 A1* 4/2012 Lowe .................... H04M 1/605
340/6.1
2013/0236027 A1* 9/2013 Tao ................... H04W 52/0241
381/74
2014/0146976 A1* 5/2014 Rundle ................ H04R 1/1083
381/71.6

OTHER PUBLICATIONS

Written Opinion of the International Searching Authority for International Application No. PCT/IB2013/002466 mailed Jul. 23, 2014, 6 pages.

* cited by examiner

METHOD IN AN ELECTRONIC MOBILE DEVICE, AND SUCH A DEVICE

CROSS REFERENCE TO RELATED APPLICATION

This application is a 35 U.S.C. §371 national stage application of PCT International Application No. PCT/IB2013/002466, filed in the English language on 6 Nov. 2013, the disclosure and content of which is incorporated by reference herein in its entirety.

TECHNICAL FIELD

Embodiments herein relates to methods for adapting audio performance parameters in electronic mobile devices. Other embodiments herein relate to an electronic mobile device.

BACKGROUND

Modern electronic mobile devices of today utilize earpiece devices with microphones mounted on the outer side of earspeakers. For example, such products are used as active noise cancelling systems and binaural microphone systems for recording. Earpiece mounted microphones may also be used for sending voice in a voice call. Utilizing ear mount microphones solely saves money due to the removal of one dedicated voice microphone.

Further, there are design advantages. A more compact design is achieved without a separate cord mounted voice microphone. Further, an ear piece mounted microphone is positioned relatively fixed in comparison to a cord mounted microphone. This may be advantageous when applying noise suppressing algorithms.

Algorithms and methods for background noise suppression by the use of earpiece mounted microphones are known. Since the earspeaker and the microphone are mounted in the same earpiece device, there will be an acoustic coupling from the earspeaker to the microphone. In a voice call this will be perceived as an acoustic echo experienced by the far end user. Normally this echo is small, due to good fit between the ear piece and the ear channel, hence high attenuation from received voice to the sent voice is achieved.

If, however, one earpiece falls out of the ear, or if the user only has only one of the earpieces inserted, there will instead be a strong echo from the received voice transmitted by the earspeaker to the sent voice transmitted by the microphone. This will give a very unpleasant voice echo in the device at the far end of a voice call.

Still further, the voice echo need to comply with the requirements in 3GPP 26.131-"Acoustic echo control in a headset UE".

SUMMARY

An object of embodiments herein is to provide a method improving audio performance of a mobile device with earpiece mounted microphones.

According to a first aspect the object is achieved by a method in a first electronic mobile device for adapting audio performance parameters. Examples of such parameters are individual control of audio levels in earspeakers, and control of placement depending noise cancellation algorithms. The first electronic mobile device performs an audio interaction with a second electronic device, and is associated with at least one earpiece comprising at least one earspeaker and at least one microphone. The first electronic mobile device detects an acoustic echo between the at least one earspeaker and the at least one microphone. The first electronic mobile device determines a position of the at least one earpiece in relation to an ear of a user of the first electronic mobile device. The position is determined based on the detected acoustic echo. Audio performance parameters are adapted, based on the detected position of the earpiece, whereby an acoustic echo present in the second electronic device during the audio interaction is reduced.

By using the amount of acoustic echo to detect earpiece position, audio performance is improved, and, among other advantages, fulfill of 3GPP standard is achieved. Further, optimizing of noise cancelling parameters will reduce noise at a far end user.

In other embodiments, detecting an acoustic echo comprises measuring an audio signal sent towards the at least one earspeaker, measuring an audio signal received by the at least one microphone, correlating the measured earspeaker audio signal with the measured microphone audio signal, whereby the acoustic echo is detected.

In other embodiments, position of the at least one earpiece in relation to the user of the first electronic mobile device is determined that it is inserted in the ear of the user if the detected acoustic echo is low.

In other embodiments, an audio signal sent to the at least one earspeaker in the at least one earpiece determined to be inserted in the ear of the user is sent with full signal level.

In other embodiments, the at least one earpiece is represented by two earpieces, each earpiece being designated for the respective ear of the user, and each comprising at least one earspeaker and at least one microphone. The method comprises applying voice enhancement algorithms and background noise suppression algorithms if respective position of the two earpieces is determined that it is inserted in the respective ear of the user.

In other embodiments, position of the at least one earpiece in relation to the user of the first electronic mobile device is determined to be outside the ear of the user if the detected acoustic echo is high.

In other embodiments, the audio signal sent to the at least one earspeaker in the earpiece determined to be positioned outside the ear of the user, is reduced, whereby the acoustic echo at the second electronic device is reduced.

In other embodiments, algorithms utilizing the symmetric placement of two ear placed microphones are disconnected if an asymmetric position of the two earpieces being determined to be positioned respectively outside and inside the ear of the user.

According to a second aspect the object is achieved by an electronic mobile device arranged to adapt audio performance parameters is provided. The first electronic mobile device is adapted to perform an audio interaction with a second electronic device, and is associated with at least one earpiece comprising at least one earspeaker and at least one microphone. The electronic mobile device comprises a processing unit arranged to detect an acoustic echo between the at least one earspeaker and the at least one microphone, to determine, based on the detected acoustic echo, position of the at least one earpiece in relation to an ear of a user of the first electronic mobile device, and to adapt audio performance parameters, based on the detected position of the earpiece, whereby acoustic echo present during the audio interaction is reduced in the second electronic device.

BRIEF DESCRIPTION OF THE DRAWINGS

Examples of embodiments herein are described in more detail with reference to attached drawings in which.

DETAILED DESCRIPTION

Embodiments herein will be exemplified in the following non-limiting description.

Figure 1:
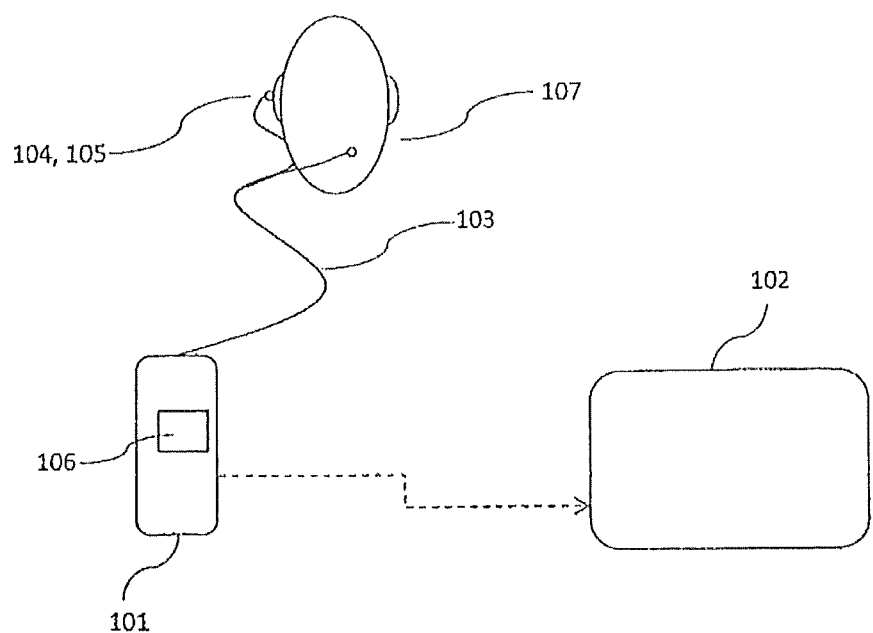
FIG. 1 shows an electronic mobile device according to embodiments herein.

FIG. 1 shows a first electronic mobile device 101 arranged to adapt audio performance parameters. Examples of a mobile electronic device 101 may for example be a mobile phone, a fixed phone headset handler, a walkie talkie or a computer. The electronic mobile device 101 is able to perform an audio interaction with a second electronic device 102. The second electronic device may be a stationary or mobile device, such as a computer, a cellular phone, a mobile phone, a fixed phone headset handler, a walkie talkie or a computer. The electronic mobile device 101 is associated with at least one earpiece 103 comprising at least one earspeaker 104 and at least one microphone 105. The electronic mobile device 101 comprises a processing unit 106 arranged to detect an acoustic echo between the at least one earspeaker 104 and the at least one microphone 105. Further, the processing unit 106 is arranged to determine, based on the detected acoustic echo, position of the at least one earpiece 103 in relation to an ear of a user 107 of the first electronic mobile device 101. The processing unit 106 is further arranged to adapt audio performance parameters, based on the detected position of the earpiece 103, whereby acoustic echo present during the audio interaction is reduced in the second electronic device 102.

Figure 2:
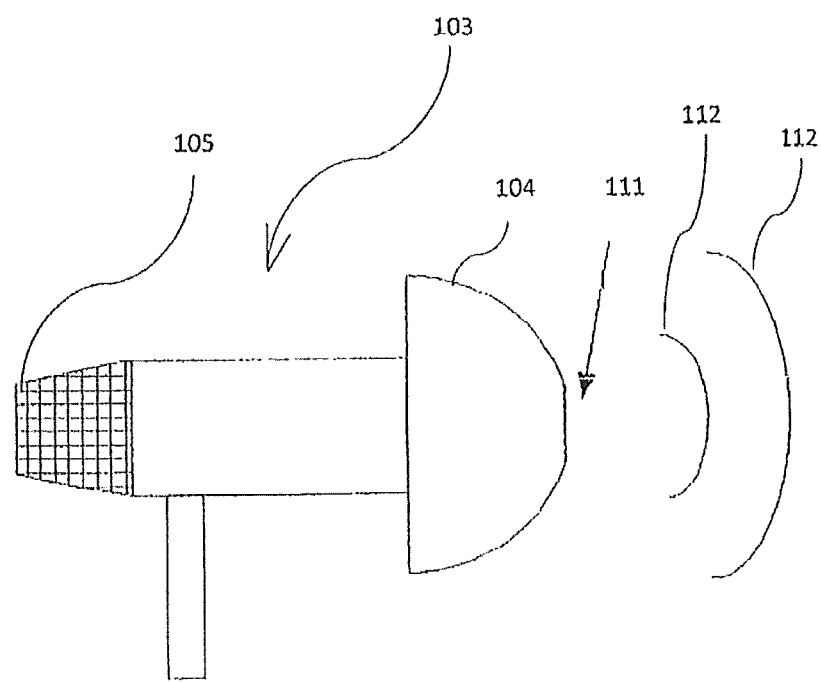
FIG. 2 shows an earpiece device according to embodiments herein.

FIG. 2 shows the earpiece 103 comprising an earspeaker 104 and a microphone 105. The earpiece 103 comprises a speaker opening 111. Sound waves 112 are generated within an ear channel of the user 107 to which the earpiece is applied.

Figure 3:
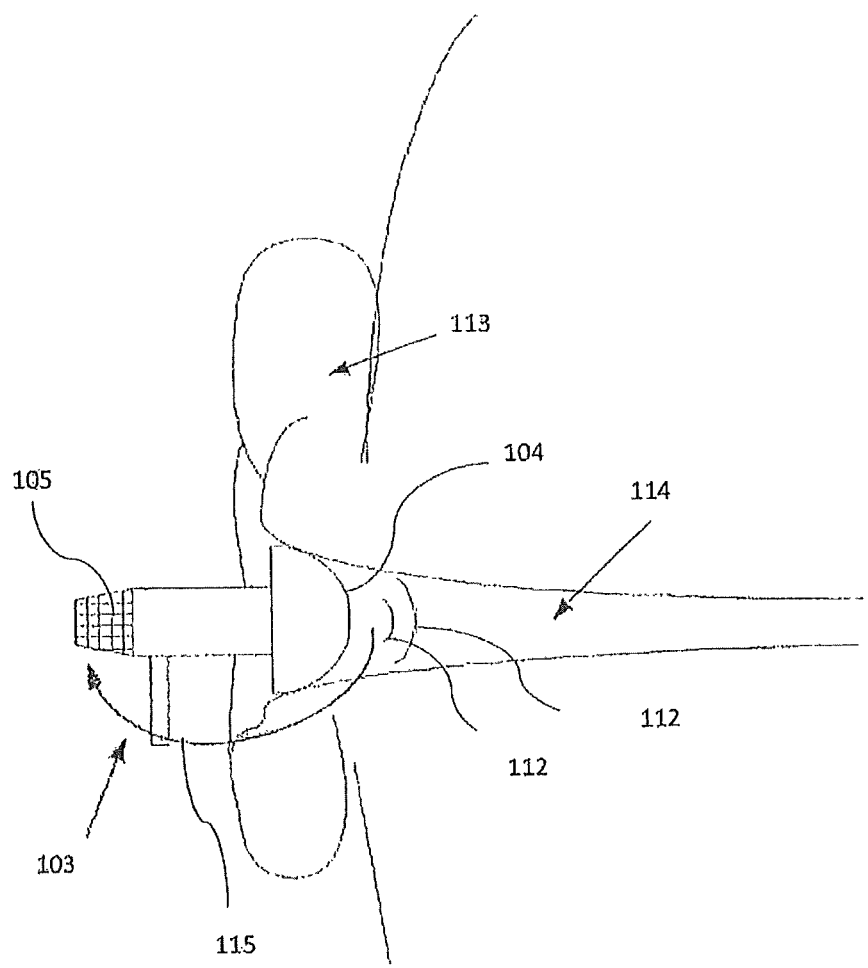
FIG. 3 shows an earpiece device inserted in the ear of a user.

FIG. 3 shows the earpiece 103 when positioned in the ear 113 of a user. Sound waves 112 are generated and supplied to the ear channel 114 to which the earpiece 103 is applied. An acoustic echo from the earspeaker 104 to the microphone 105 will occur, and is illustrated as an arrow 115. Due to the good fit between the earpiece 103 and the ear channel 114 the acoustic echo is low.

Figure 4:
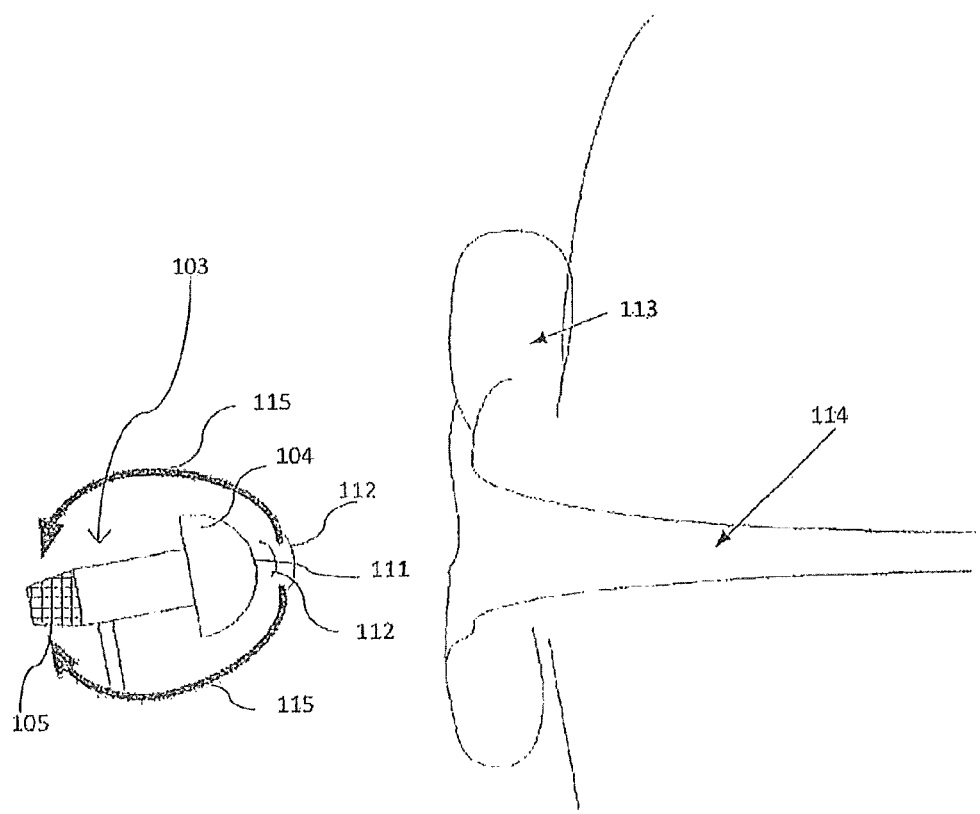
FIG. 4 shows an earpiece device when positioned outside the ear of a user.

FIG. 4 shows the earpiece 103 when it is positioned outside the ear 113 of a user. Sound waves 112 are still generated. The acoustic echo from the earspeaker 104 to the microphone 105 will, in this case, be much larger compared to when the earpiece is positioned in the ear of the user, as illustrated by the arrows 115. The first electronic mobile device 101 performs an audio interaction with the second electronic device 102. Example of such audio interaction is a voice call, or any device using voice input and audio output, like speech to text converters with audio feedback. The first electronic mobile device 101 is configured to adapt audio performance parameters, whereby improved voice quality during the audio interaction is achieved, taken into consideration the amount of the acoustic echo present from the earspeaker to the microphone.

In the first electronic mobile device 101 the at least one earpiece 103 may be represented by two earpieces. Each earpiece 103 is designated for the respective ear of the user, and each comprises at least one earspeaker 104 and at least one microphone 105. The first electronic mobile device 101 may then further be configured to apply voice enhancement algorithms and background noise suppression algorithms if respective position of the two earpieces 103 is determined that it is inserted in the respective ear of the user 106.

Figure 5:
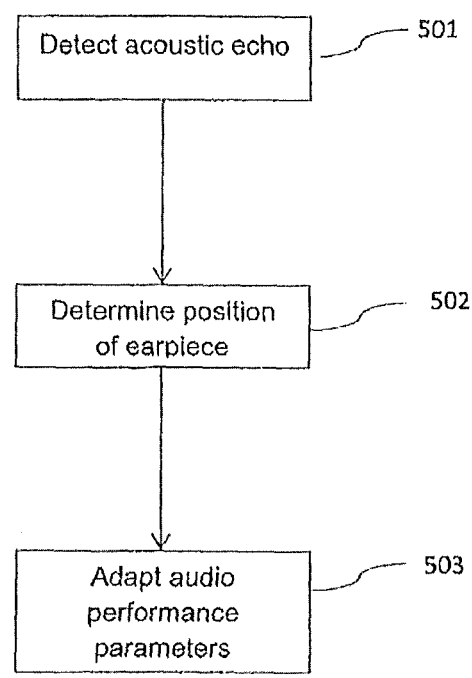
FIG. 5 is a flow chart showing methods herein.

With reference to FIG. 5, a method in the first electronic mobile device 101 will now be described.

Action 501

The first electronic mobile device 101 detects an acoustic echo between the at least one earspeaker 104 and the at least one microphone. This may be performed by measuring an audio signal sent towards the at least one earspeaker 104, and measuring an audio signal received by the at least one microphone 105. The measured earspeaker 104 audio signal may be correlated with the measured microphone 105 audio signal, whereby the acoustic echo is detected.

The acoustic echo between the earspeaker and the microphone may be measured as the correlation between sent audio towards earspeaker and received audio by earpiece mount microphone. When the measured echo in one earpiece is high, the earpiece is out taken from the ear, or never inserted. This information could be used for many purposes, for example improving the audio quality of a voice call. Reducing audio output in an outtaken earpiece will reduce the echo for a far end user, and adaption of parameters in noise suppressing algorithms will keep the noise suppression at optimum independent of the earpiece position.

Action 502

The first electronic mobile device 101 determines, based on the detected acoustic echo, a position of the at least one earpiece 103 in relation to an ear of a user 107 of the first electronic mobile device 101. Position of the at least one earpiece 103 in relation to the user 107 of the first electronic mobile device 101 is determined to be inserted in the ear of the user 107 if the detected acoustic echo is low. Thus, when the measured acoustic echo in one earpiece is low, the earpiece is inserted. The position of the at least one earpiece 103 in relation to the user 107 of the first electronic mobile device 101 is determined to be outside the ear of the user if the detected acoustic echo is high.

Action 503

The first electronic mobile device 101 adapts audio performance parameters, based on the detected position of the earpiece 103, whereby an acoustic echo present in the second electronic device 102 during the audio interaction is reduced. An audio signal sent to the at least one earspeaker 104 in the at least one earpiece 103 determined to be inserted in the ear of the user 107 is sent with full signal level. At insert detect, the audio to the earspeaker in the inserted earpiece is sent with full signal level. The audio signal sent to the at least one earspeaker 104 in the earpiece 103 determined to be positioned outside the ear of the user, is reduced, whereby the acoustic echo at the second electronic device 102 is reduced. Thus, at outtake detect, audio to the earspeaker in the outtaken earpiece is reduced to a level where the echo at the far end user is acceptable. Algorithms utilizing the symmetric placement of two ear placed microphones are disconnected if the two earpieces 103 are determined to be positioned respectively outside and inside the ear of the user.

At insert detect in both ears, voice enhancement algorithms and background noise suppression algorithms, depending on the symmetric placement of two ear placed microphones are applied. Note, if the level is not completely muted, insert detect measurements by echo is still possible.

At outtake detect, algorithms utilizing the symmetric placement of two ear placed microphones are disconnected. Note, the signal from the outtaken microphone may still be used for sending voice. The proposed methods enable good voice quality for sending voice independent of how the sending user uses the earpieces. For example, sometimes the user may take one earpiece out and hold it like a mouth mount microphone to increase intelligibility. The proposed methods will increase quality for example for voice calls. Further, the proposed methods may be completely transparent for the user.

Figure 6:
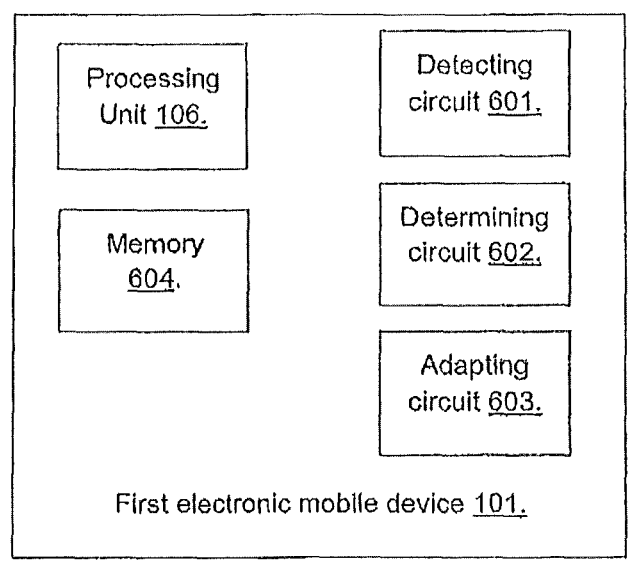
FIG. 6 shows a first electronic mobile device.

FIG. 6 shows a first electronic mobile device 101. The first electronic mobile device 101 is arranged to adapt audio performance parameters. The first electronic mobile device 101 is adapted to perform an audio interaction with a second electronic device 102. The first electronic mobile electronic device 101 is associated with at least one earpiece 103 comprising at least one earspeaker 104 and at least one microphone 105. The first electronic mobile device 101 comprises a processing unit 106 and a detecting circuit 601 configured to detect an acoustic echo between the at least one earspeaker 104 and the at least one microphone 105. The first electronic mobile comprises a determining circuit 602 configured to determine, based on the detected acoustic echo, a position of the at least one earpiece 103 in relation to an ear of a user 106 of the first electronic mobile device 101. The first electronic mobile device further comprises an adaption circuit 603 configured to adapt audio performance parameters, based on the detected position of the earpiece 103, whereby acoustic echo present during the audio interaction is reduced in the second electronic device 102. The first electronic device further comprises a memory 604.

Further, in the previous description specific details have been set forth, such as particular embodiments for purposes of explanation and not limitation. However, it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes, e.g. a wireless modem or a wireless device, using hardware circuitry, e.g., analogue and/or discrete logic gates interconnected to perform a specialized function, ASICs, PLAs, etc., and/or using software programs and data in conjunction with one or more digital microprocessors or general purpose computers. Nodes that communicate using the air interface also have suitable radio communications circuitry. Moreover, the technology may additionally be considered to be embodied entirely within any form of computer-readable memory 604, such as solid-state memory, magnetic disk, or optical disk comprising an appropriate set of computer instructions that would cause a processor to carry out the techniques described herein.

Hardware implementation may include or encompass, without limitation, digital signal processor, DSP, hardware, a reduced instruction set processor, hardware, e.g., digital or analogue circuitry including but not limited to Application Specific Integrated Circuits, ASIC, and/or Field Programmable Gate Arrays, FPGAs, and where appropriate state machines capable of performing such functions.

In terms of computer implementation, a computer is generally understood to comprise one or more processors or one or more controllers, and the terms computer, processor, processing unit 601 and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Although the description above comprises many specifics, they should not be construed as limiting but as merely providing illustrations of some presently preferred embodiments. The technology fully encompasses other embodiments which may become apparent to those skilled in the art. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of consist at least of.

When using the word action/actions it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used.

The invention claimed is:

1. A method in an electronic mobile device for adapting audio performance parameters, the electronic mobile device performing an audio interaction with another electronic device,
   the electronic mobile device being associated with at least one earpiece comprising at least one earspeaker and at least one microphone, the method comprising:
   detecting an acoustic echo between the at least one earspeaker and the at least one microphone,
   determining, based on the detected acoustic echo, a position of the at least one earpiece in relation to an ear of a user of the electronic mobile device, and
   adapting audio performance parameters, based on the position of the at least one earpiece, whereby an acoustic echo present in the another electronic device during the audio interaction is reduced,
   wherein the position of the at least one earpiece in relation to the ear of the user of the electronic mobile device is determined to be inserted in the ear of the user if the detected acoustic echo is below a defined threshold.

2. The method according to claim 1, wherein detecting the acoustic echo comprises:
   measuring an audio signal sent towards the at least one earspeaker,
   measuring an audio signal received by the at least one microphone,
   correlating the measured earspeaker audio signal with the measured microphone audio signal, whereby the acoustic echo is detected.

3. A method according to claim 1, wherein an audio signal sent to the at least one earspeaker in the at least one earpiece is sent with a full signal level in response to determining that the at least one earpiece is inserted in the ear of the user.

4. The method according to claim 1, wherein the at least one earpiece comprises two earpieces, each earpiece being designated for the respective ear of the user, and each comprising at least one earspeaker and at least one microphone, wherein the method comprises applying voice enhancement algorithms and background noise suppression algorithms if respective position of the two earpieces is determined to be inserted in the respective ear of the user.

5. A method in an electronic mobile device for adapting audio performance parameters, the electronic mobile device performing an audio interaction with another electronic device,
the electronic mobile device being associated with at least one earpiece comprising at least one earspeaker and at least one microphone, the method comprising:
detecting an acoustic echo between the at least one earspeaker and the at least one microphone,
determining, based on the detected acoustic echo, a position of the at least one earpiece in relation to an ear of a user of the electronic mobile device, and
adapting audio performance parameters, based on the position of the at least one earpiece, whereby an acoustic echo present in the another electronic device during the audio interaction is reduced,
wherein the position of the at least one earpiece in relation to the ear of the user of the electronic mobile device is determined to be outside the ear of the user if the detected acoustic echo is above a defined threshold.

6. A method according to claim 5, wherein the audio signal sent to the at least one earspeaker in the earpiece is reduced in response to determining that the at least one earpiece is positioned outside the ear of the user, whereby the acoustic echo at the electronic device is reduced.

7. A method according to claim 5, wherein the at least one earpiece comprises two earpieces, each earpiece being designated for the respective ear of the user, and each comprising at least one earspeaker and at least one microphone, wherein the method further comprises:
upon determining an asymmetric positioning of the two earpieces in the sense of one earpiece being positioned outside and one earpiece being positioned inside the respective ear of the user, disconnecting algorithms utilizing a symmetric placement of two ear placed microphones.

8. The method according to claim 5, wherein detecting the acoustic echo comprises:
measuring a first audio signal sent towards the at least one earspeaker,
measuring a second audio signal received by the at least one microphone,
correlating the first audio signal with the second audio signal to detect the acoustic echo.

9. An electronic mobile device arranged to adapt audio performance parameters, the electronic mobile device adapted to perform an audio interaction with another electronic device,
the electronic mobile device being associated with at least one earpiece comprising at least one earspeaker and at least one microphone,
the electronic mobile device comprising:
a detecting circuit configured to detect an acoustic echo between the at least one earspeaker and the at least one microphone,
a determining circuit configured to determine, based on the detected acoustic echo, a position of the at least one earpiece in relation to an ear of a user of the electronic mobile device, and
an adaption circuit configured to adapt audio performance parameters, based on the position of the at least one earpiece, whereby acoustic echo present during the audio interaction is reduced in the another electronic device,
wherein:
the determining circuit is configured to determine that the at least one earpiece is positioned in the ear of the user based on the detected acoustic echo being below a defined threshold, and to determine that the at least one earpiece is positioned outside the ear of the user based on the detected acoustic echo being above the defined threshold.

10. The electronic mobile device of claim 9, wherein:
the adaption circuit is configured to send a full signal level audio signal to the at least one earspeaker in the at least one earpiece based on the determining circuit determining that the at least one earpiece is positioned in the ear of the user, and to reduce a signal level of the audio signal sent to the at least one earspeaker in the at least one earpiece based on the determining circuit determining that the at least one earpiece is positioned outside the ear of the user.

11. The electronic mobile device of claim 9, wherein:
the adaption circuit is configured to apply a voice enhancement algorithm and background noise suppression algorithm to an audio signal from the at least one microphone based on the determining circuit determining that the at least one earpiece is positioned in the ear of the user, and to not apply the voice enhancement algorithm and background noise suppression algorithm to the audio signal from the at least one microphone based on the determining circuit determining that the at least one earpiece is positioned outside the ear of the user.

* * * * *